US00RE43475E

(19) United States
(12) Reissued Patent
Dekker et al.

(10) Patent Number: US RE43,475 E
(45) **Date of Reissued Patent: *Jun. 19, 2012**

(54) VENETIAN BLIND WITH VARIABLE TILTING

(75) Inventors: Nicolaas Dekker, Rhoon (NL); Antonius Johannes Josephus Horsten, The Hague (NL)

(73) Assignee: Hunter Douglas Industries BV, El Rotterdam (NL)

( * ) Notice: This patent is subject to a terminal disclaimer.

(21) Appl. No.: 10/624,938

(22) Filed: Jul. 21, 2003

Related U.S. Patent Documents

Reissue of:
(64) Patent No.: 6,422,288
Issued: Jul. 23, 2002
Appl. No.: 09/853,952
Filed: May 10, 2001

(51) Int. Cl.
*E06B 9/26* (2006.01)

(52) U.S. Cl. ..... 160/115; 160/177 R

(58) Field of Classification Search ..... 160/115, 160/176.1 R, 168.1 R, 107, 114, 113, 173 R, 160/177 R
See application file for complete search history.

(56) References Cited

U.S. PATENT DOCUMENTS

| | | | | |
|---|---|---|---|---|
| 1,365,919 | A * | 1/1921 | Jones | 160/115 |
| 2,116,356 | A * | 5/1938 | Laborda et al. | 160/115 |
| 2,427,266 | A * | 9/1947 | Ewing | 160/115 |
| 2,506,507 | A * | 5/1950 | Kiatta | 160/115 |
| 2,719,586 | A * | 10/1955 | Graham | 160/115 |
| 2,747,662 | A * | 5/1956 | Reiners et al. | 160/178.3 |
| 2,751,000 | A * | 6/1956 | Mahan | 160/115 |
| 4,921,032 | A * | 5/1990 | May | 160/84.01 |
| 4,940,070 | A * | 7/1990 | Warden | 160/176.1 R |
| 5,472,035 | A * | 12/1995 | Biba et al. | 160/168.1 R |
| 5,485,874 | A * | 1/1996 | Whitmore | 160/115 |
| 6,105,652 | A * | 8/2000 | Judkins | 160/115 |
| 6,318,439 | B1 * | 11/2001 | Matsubara | 160/115 |

FOREIGN PATENT DOCUMENTS

AU 410797 7/1969

(Continued)

*Primary Examiner* — David Purol
(74) *Attorney, Agent, or Firm* — Dorsey & Whitney LLP

(57) ABSTRACT

A venetian blind including vertically-extending slat-supporting ladders is described. Each ladder comprises (i) first and second vertical members connected by cross-rungs, (ii) slats, each slat being supported on a cross rung of each ladder, (iii) an adjusting mechanism for pivoting the slats about their longitudinal axes by moving the vertical members in opposite directions, (iv) a vertically-extending auxiliary tilt cord that is adjacent to the first vertical member, and (v) an engagement mechanism on the auxiliary tilt cord and the first vertical member for moving the first vertical member at an intermediate location along its length upwardly with upward movement of the auxiliary tilt cord to adjust the angular pivot of a section of the cross-rungs connected to the first vertical member above or below the intermediate location. The engagement mechanism including (a) a guiding loop on the first vertical member, (b) a bead fixed on the auxiliary tilt cord and vertically spaced away from the guiding loop and (c) an engaging collar slidably positioned on the auxiliary tilt cord between the guiding loop and the bead, the auxiliary tilt cord extending through the guiding loop. The bead is adapted to engage the engaging collar and move the engaging collar toward the guiding loop to engage the guiding loop when the auxiliary tilt cord is moved upwardly. The blind including a winding drum for winding the auxiliary tilt cord and moving the cord upwardly after the adjusting mechanism has moved the first and second vertical members in opposite directions.

30 Claims, 7 Drawing Sheets

FOREIGN PATENT DOCUMENTS

| | | |
|---|---|---|
| DE | 134151 | 8/1901 |
| DE | 69 36665 | 9/1969 |
| EP | 0 609 541 | 8/1994 |
| EP | 0 620 355 | 10/1994 |
| EP | 0 696 672 | 10/1999 |
| GB | 1093756 | 12/1967 |
| JP | 63-55595 | 11/1984 |
| JP | 8-210060 | 8/1996 |
| JP | 9-21282 | 1/1997 |
| WO | 98/27307 | 6/1998 |

* cited by examiner

AMENDED
Fig.1.
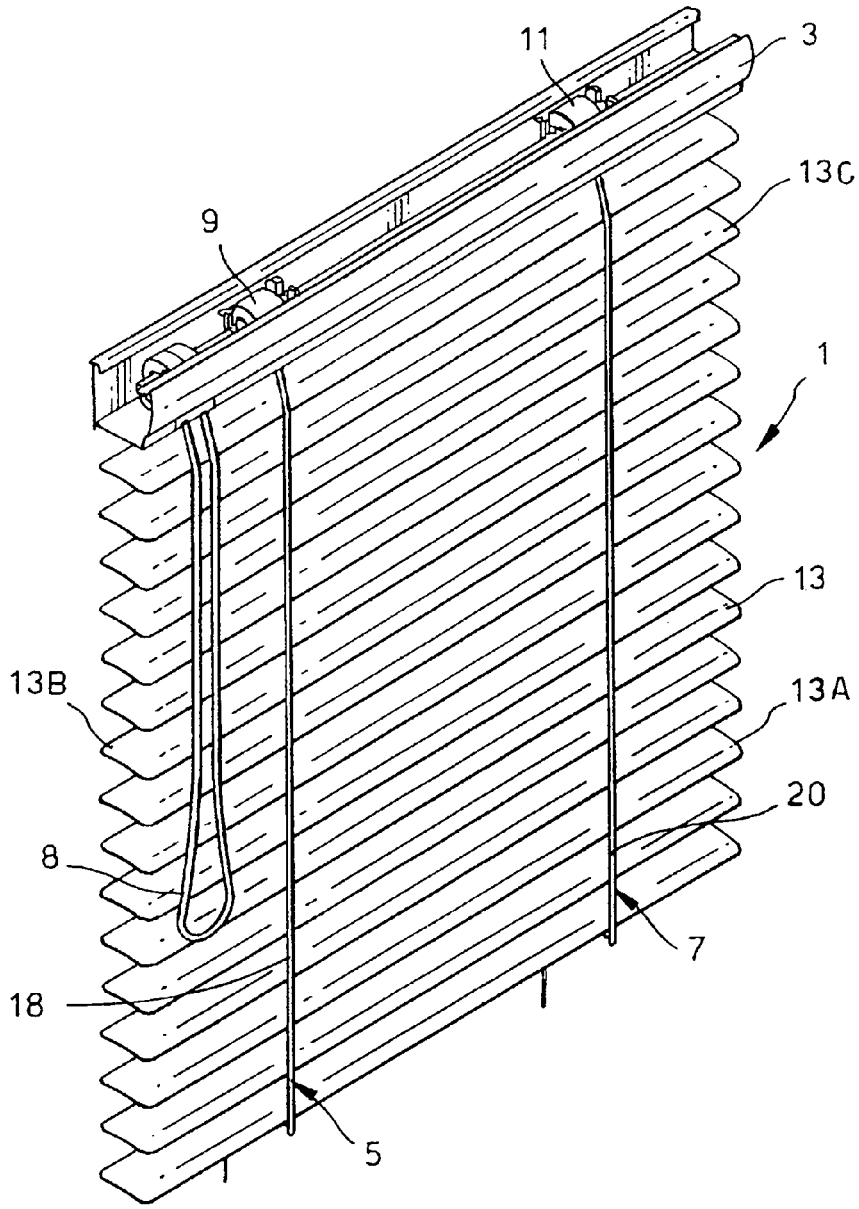

AMENDED
Fig.2.
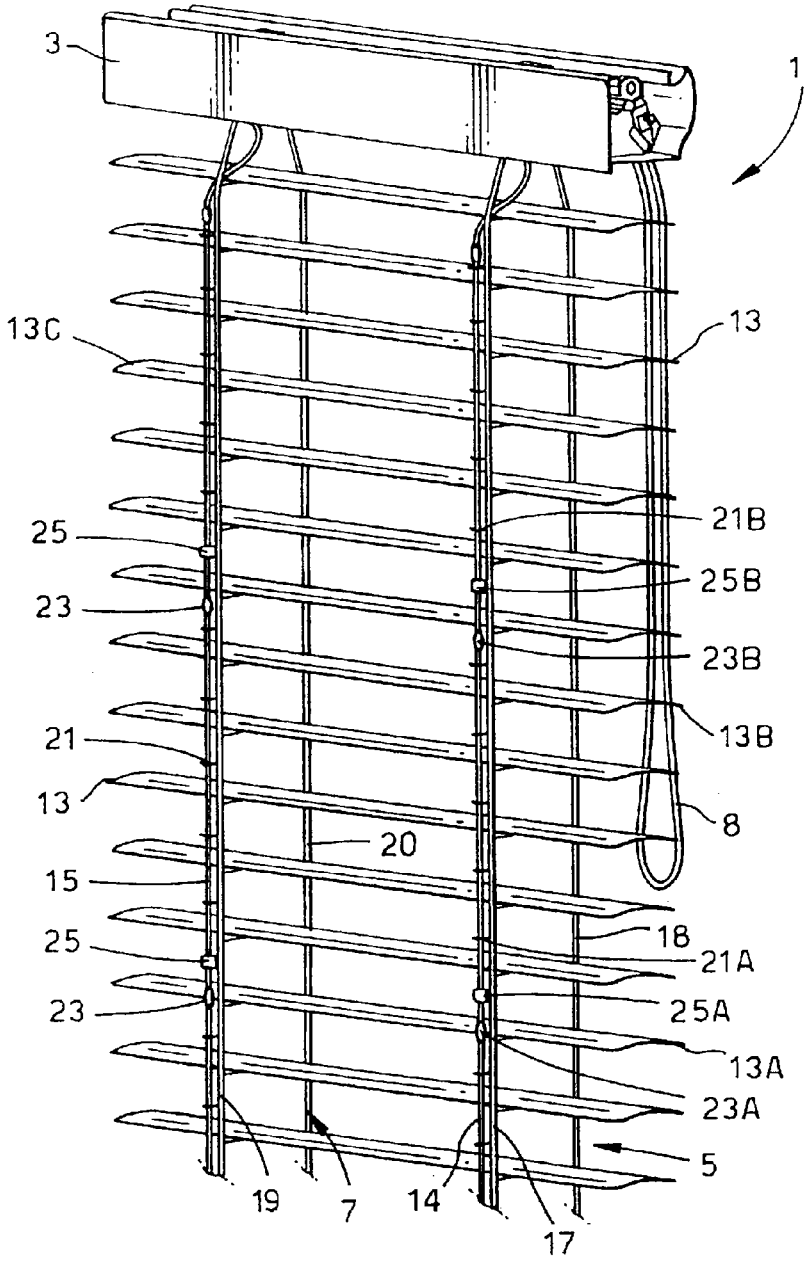

AMENDED
Fig.3.
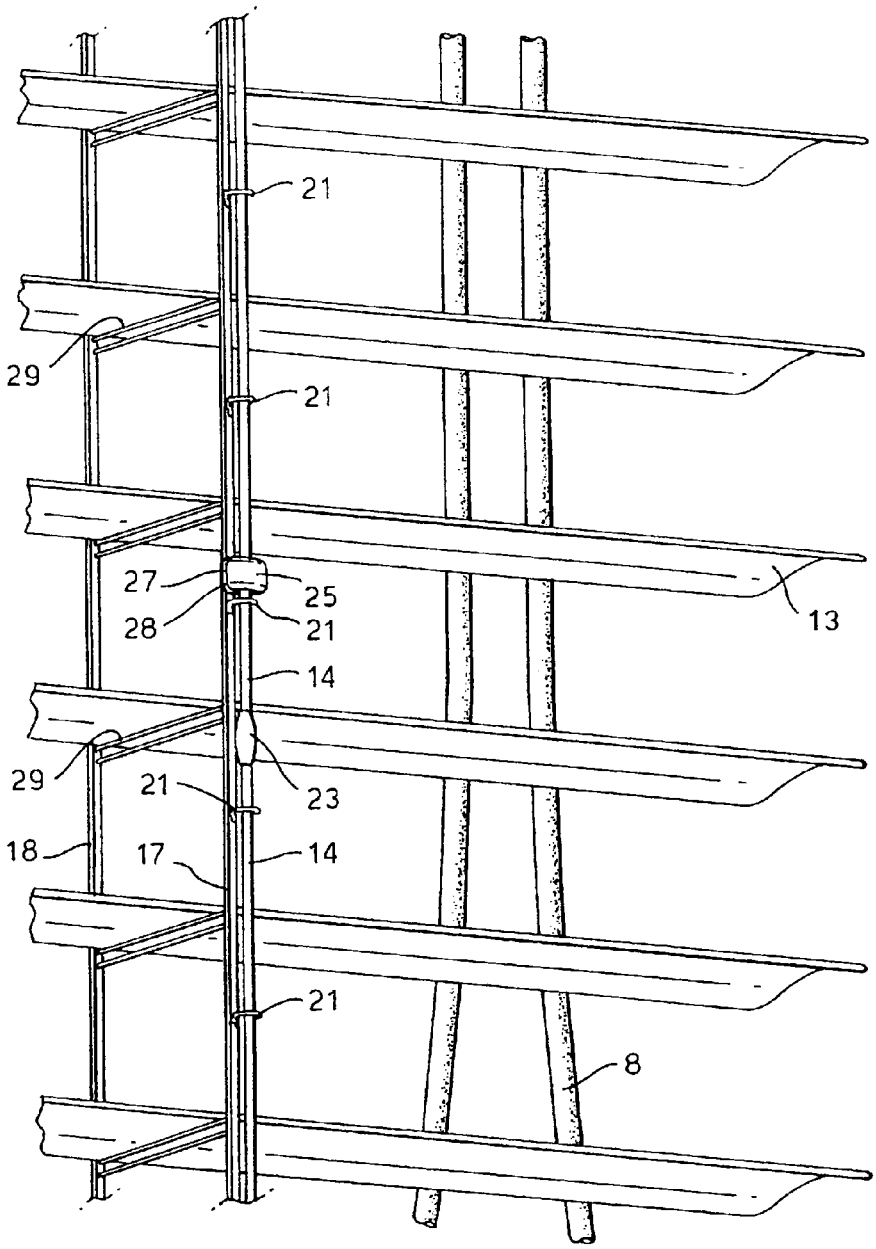

AMENDED
Fig.4.
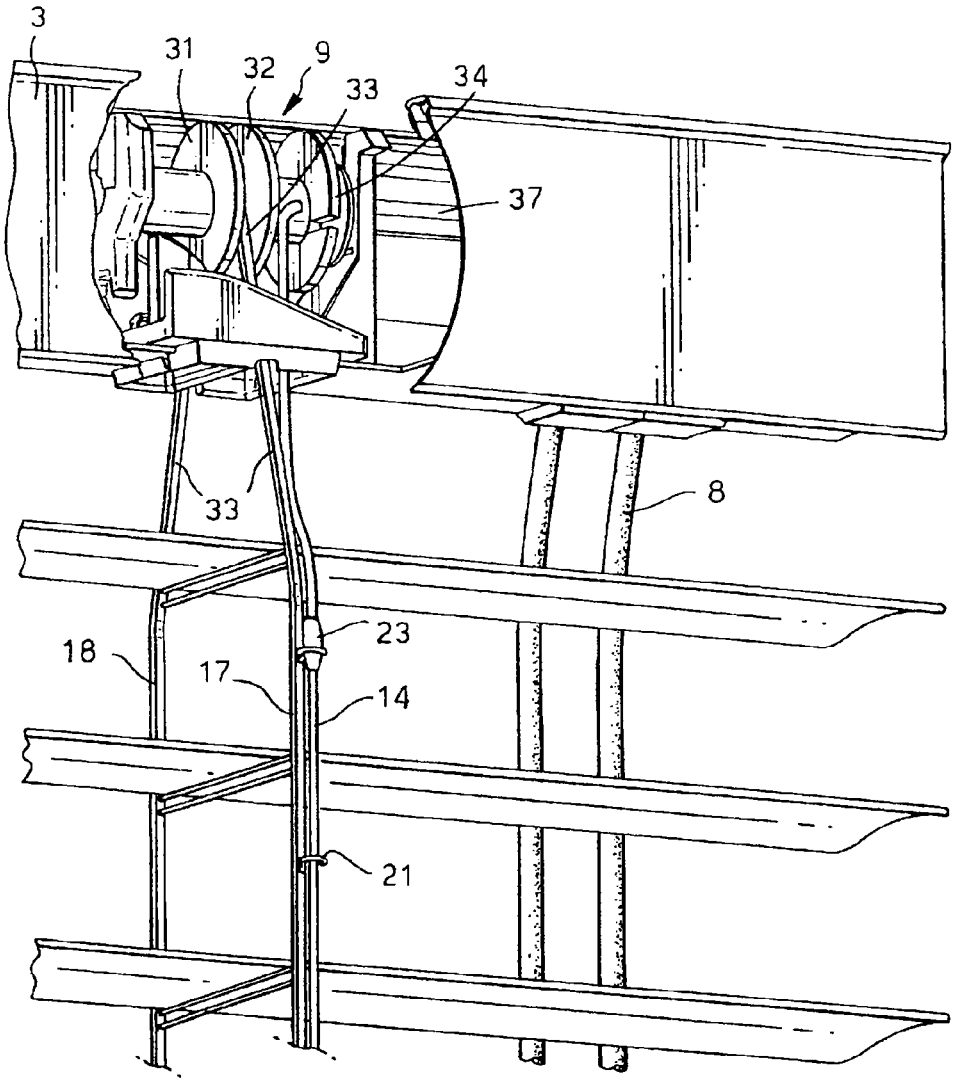

AMENDED
Fig.5.
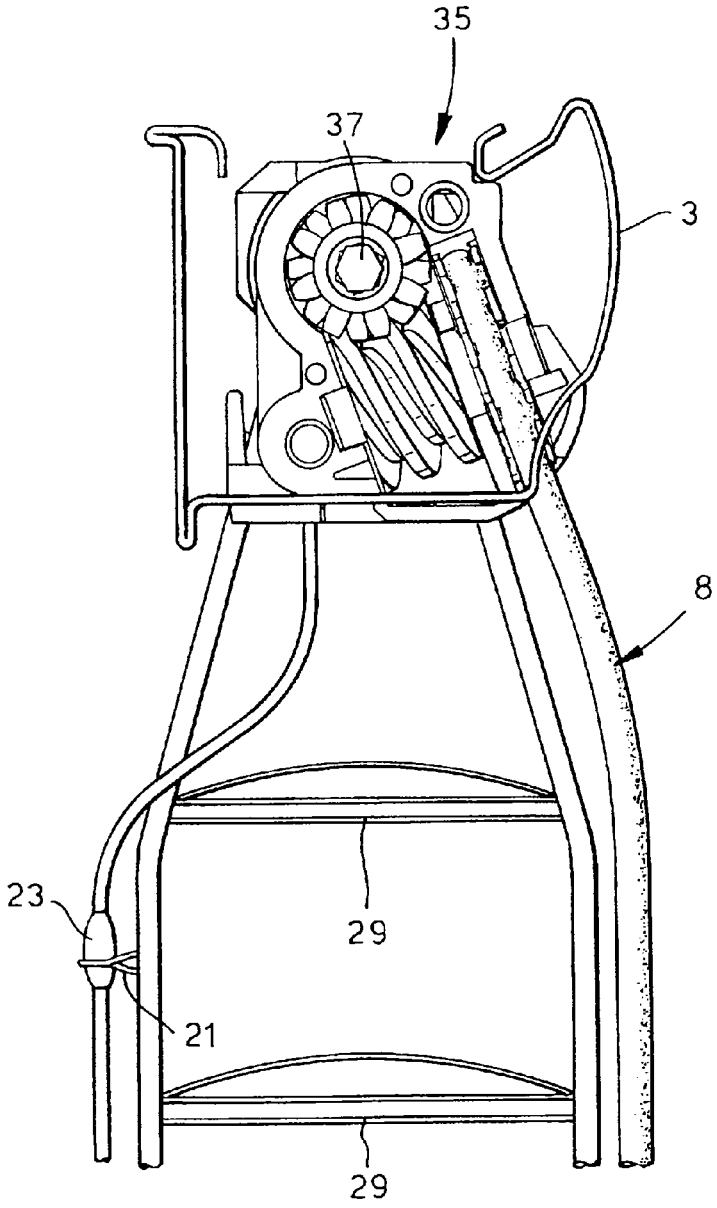

AMENDED
Fig.6.
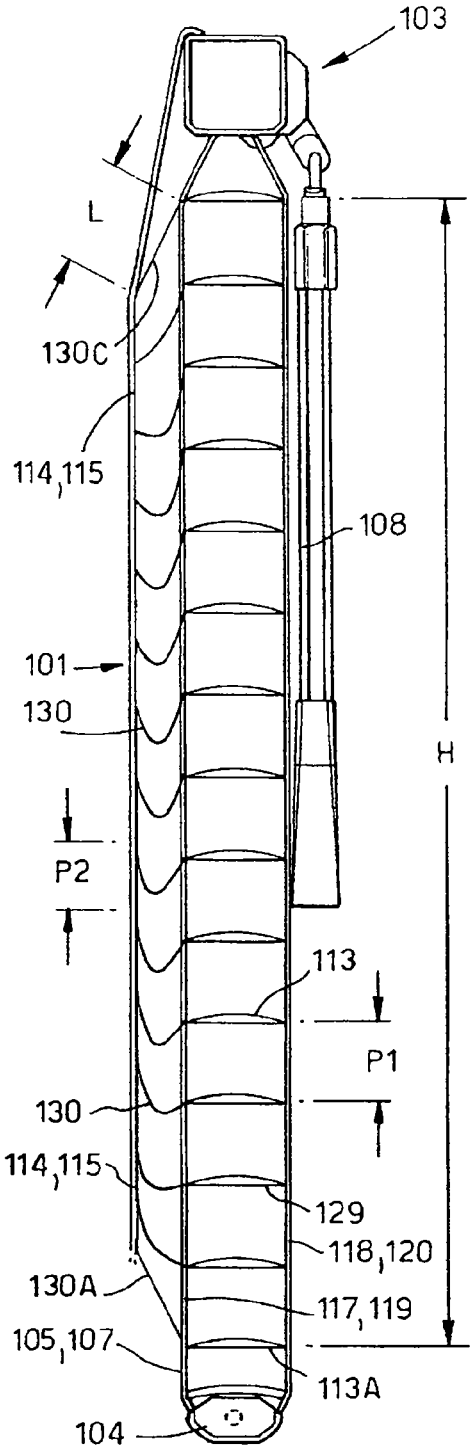

NEW

VENETIAN BLIND WITH VARIABLE TILTING

Matter enclosed in heavy brackets [ ] appears in the original patent but forms no part of this reissue specification; matter printed in italics indicates the additions made by reissue.

BACKGROUND OF INVENTION

1. Field of the Invention

This invention relates to a venetian blind, the slats of which can be tilted to different angles relative to one another (i.e., variably tilted). When the slats of such a blind have been tilted, so that they are closed in a normal fashion, the slats of a lower portion of the blind, in front of a room window, can be tilted to an open position to provide a view of the outside, while at the same time, the slats of the blind's upper portion can be left tilted in a closed position to reduce the amount of sunlight coming into the room. Alternatively, an upper portion of the blind can be tilted to an open position to admit some sunlight into the room, while at the same time, the slats of the blind's lower portion can be left tilted in a closed position to provide privacy in the room and/or reduce the amount of sunlight in the room, for example to prevent glare from interfering with the use of computer or television screens in the room.

2. Description of the Art

Venetian blinds have generally included: a horizontally-elongated head rail; a plurality of horizontally-elongated slats beneath the head rail and parallel to it; and at least two slat-supporting ladders movably suspended from the head rail and supporting the slats in vertically spaced apart relationship. In this regard, each ladder generally has had front and rear, vertically-extending members that have been connected to each other by a plurality of vertically-spaced cross-rungs. Supported on each cross-rung, between the vertically-extending members of its ladder, has been one length-wise side of a slat. The head rail generally has had an adjusting mechanism for moving the ladders, so that the vertically-extending members of each ladder move in opposite vertical directions relative to one another, to pivot each slat about its length-wise axis.

It has also been known to provide a venetian blind with a vertically-extending auxiliary tilt cord to provide variable tilting of its slats. The auxiliary tilt cord has been adapted to engage at least one of the vertically-extending members of the blind's ladders, at an intermediate location along its height, and when manipulated, to adjust the angle of pivot of the slats below the intermediate location. See U.S. Pat. Nos. 2,427,266, 2,719,586, 2,751,000, 4,940,070, EP 0 620 355 and JP(A) 8-210060. Although such a blind has been reasonably successful in providing a room with both privacy and some sunlight, the blind has generally been rather complicated to manufacture and use.

SUMMARY OF THE INVENTION

In accordance with this invention, a venetian blind is provided which includes a plurality of horizontally-elongated slats; at least two ladders supporting the slats in vertically spaced apart relationship; an adjusting mechanism for moving the vertical members of each ladder in opposite vertical directions, relative to one another, to pivot each slat about its length-wise axis; and an auxiliary tilt cord which can be moved vertically and can engage a vertically-extending member of one of the ladders at an intermediate location along the height of the one ladder; and wherein a plurality of regularly-spaced guiding loops are along the height of the one ladder; and wherein the auxiliary tilt cord comprises:

- a plurality of regularly spaced beads along its length; and
- an engaging collar that is mounted about the auxiliary tilt cord and between a predetermined pair of adjacent guiding loops and that is adapted to be engaged by each of the beads; and
- wherein each of the guiding loops is adapted to be engaged by the engaging collar, while the beads are adapted to pass through the loops unobstructed if not prevented from doing so by the engaging collar.

This blind with variable tilting of its slats is easier to assemble and operate and can also be made somewhat less expensively.

Advantageously, this blind also includes: means for adjusting the angular pivot of the slats, below the intermediate location along the height of the one ladder, which comprises:

- a drum, connected to the adjusting mechanism, for winding the auxiliary tilt cord only after the adjusting mechanism has fully pivoted each slat in one of two opposite directions about its length-wise axis.

Also in accordance with this invention, a venetian blind is provided which includes a plurality of horizontally-elongated slats; at least two ladders supporting the slats in vertically spaced apart relationship; an adjusting mechanism for moving the vertical members of each ladder to move in opposite vertical directions, relative to one another, to pivot each slat about its length-wise axis; and an auxiliary tilt cord which engages a vertically-extending member of one of the ladders at an intermediate location along the height of the one ladder; and which also includes means for adjusting the angular pivot of the slats below the intermediate location along the height of the one ladder, comprising:

- a drum, connected to the adjusting mechanism, for winding the auxiliary tilt cord only after the adjusting mechanism has fully pivoted each slat in one of two opposite directions about its length-wise axis.

Advantageously, this blind also includes a plurality of regularly-spaced guiding loops along the height of the one ladder; and the auxiliary tilt cord comprises:

- a plurality of regularly spaced beads along its length; and
- an engaging collar that is mounted about the auxiliary tilt cord and between a predetermined pair of adjacent guiding loops and that is adapted to be engaged by each of the beads; and
- wherein each of the guiding loops is adapted to be engaged by the engaging collar, while the beads are adapted to pass through the loops unobstructed if not prevented from doing so by the engaging collar.

BRIEF DESCRIPTION OF THE DRAWINGS

Further aspects of the invention will be apparent from the detailed description below of specific embodiments and the drawings thereof, in which:

FIG. 1 is a partial perspective view of a front side (e.g., facing a room) of a venetian blind of this invention;

FIG. 2 is a partial perspective view of a rear side (e.g., facing a window) of the blind of FIG. 1, showing auxiliary tilt cords associated with vertical members of its slat-supporting ladders;

FIG. 3 is an enlarged perspective detail view of a portion of the rear of the blind of FIG. 1 on the blind's left side (as viewed from its front as in FIG. 1);

FIG. 4 is an enlarged perspective view of a top portion of the rear of the blind of FIG. 1 on its left side, with its head rail partly broken away to show its internal mechanisms;

FIG. 5 is a partial elevation view showing a top portion of the left side of the head rail of the blind of FIG. 1;

FIG. 6 is a side elevation view of a second embodiment of a venetian blind of this invention, viewed from the blind's left side.

DETAILED DESCRIPTION OF THE PREFERRED EMBODIMENT

Figure 7:
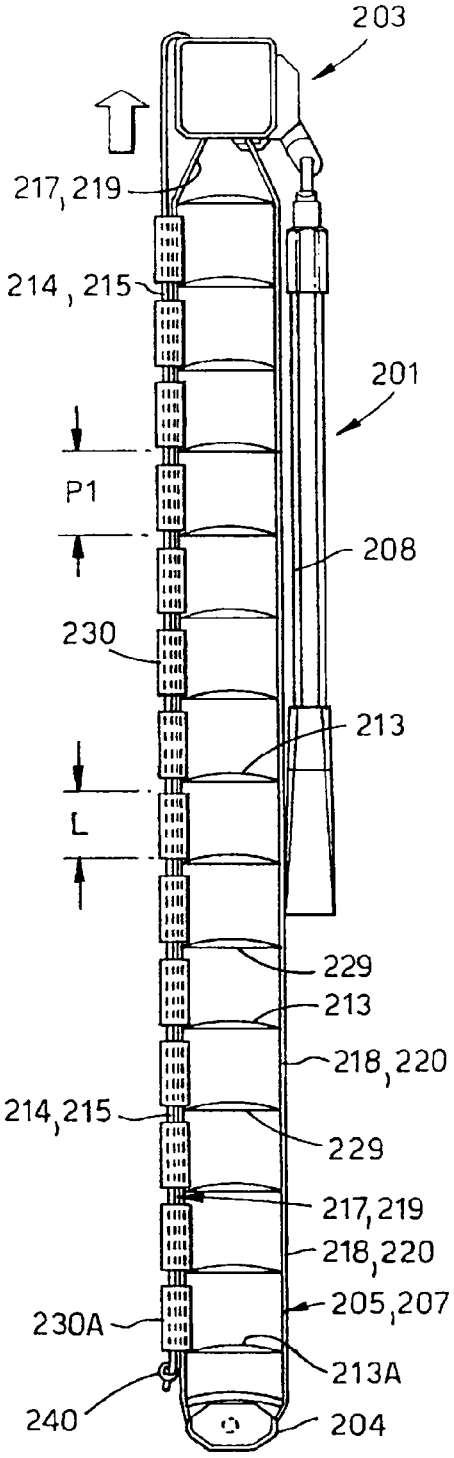
FIG. 7 is a side elevation view of a third embodiment of a venetian blind of this invention, viewed from the blind's left side.

FIGS. 1-5 show a first embodiment of a venetian blind 1 of this invention. As best seen in FIG. 1, the blind 1 has a generally conventional, horizontallyextending head rail 3, horizontally-extending bottom rail (not shown) and pair of vertically-extending slat-supporting ladders 5 and 7. The ladders 5, 7 are suspended from the head rail 3 in a conventional manner so as to be movable by a pair of tilt pivot swivels 9 and 11, respectively, in the head rail. As will be described in detail below with reference to FIGS. 2, 3 and 5, the ladders 5, 7 hold a plurality of conventional horizontally-elongated slats 13, so that they are suspended horizontally from the head rail 3. A conventional, manually operable, cord loop 8 is suspended from the front of the head rail 3. The cord loop 8 is connected to the tilt swivels 9, 11 in the head rail 3. The tilt swivels 9, 11 can move the front and rear of the ladders 5, 7, relative to each other, to adjust the angular position or tilt of all the slats 13 (i.e., pivot the slats about their longitudinal axes) in response to movement of the cord loop 8.

FIGS. 2 and 3 show best a pair of vertically-extending auxiliary tilt cords 14, 15 at the rear of the blind 1 and a first or rear, vertical member 17, 19 and a second or front, vertical member 18, 20 of each ladder 5, 7 of the blind. The rear and front vertical members 17-20 extend parallel to each other and are interconnected by a plurality of laterally-extending cross-rungs 29 (see FIG. 3). The cross-rungs 29 are spaced vertically apart along the height of the vertical members 17-20 of the ladders 5, 7 at a regular pitch (which is the distance between two vertically adjacent slat supporting rungs 29).

Each vertically-extending auxiliary tilt cord 14, 15 is located adjacent the rear vertical member 17, 19 of one of the ladders 5, 7, respectively. Each tilt cord 14, 15 is connected to, and engages, its adjacent rear vertical member 17, 19 at a plurality of predetermined intermediate locations along the height of the tit cord and its adjacent rear vertical member. In this regard:

- a plurality of rearwardly-extending guiding loops or eyelets 21 are fixed on each rear vertical member 17, 19 along its height and extend about its adjacent auxiliary tilt cord 14, 15;
- a plurality of beads 23 are fixed on each auxiliary tilt cord 14, 15, along its height; and
- a plurality of engaging collars 25 are slidably located on each auxiliary tilt cord 14, 15, along its height, each collar 25 being located between a selected pair of vertically adjacent guiding loops 21 on the adjacent rear vertical member 17, 19 and above a bead 23 on the auxiliary tilt cord.

The plurality of guiding loops 21 are preferably regularly spaced along the height of each rear vertical member 17, 19, and the plurality of beads 23 are preferably regularly spaced along the height of each auxiliary tilt cord 14, 15. The vertical spacing or pitch ($P_{(beads)}$) of the regularly spaced beads 23 along each auxiliary tilt cord 14, 15 is preferably the same and preferably slightly less than the pitch ($P_{(rungs)}$) of the cross-rungs; for example: $P_{(beads)}=P_{(rungs)}-1$ or an integral multiple ($X_1$) thereof (i.e., $X_1 * (P_{(rungs)}-1)$. The pitch ($P_{(loops)}$) of the regularly spaced guiding loops 21 along each auxiliary tilt cord is also preferably the same and is preferably the same absolute value as $P_{(rungs)}$, but it can also be an integral multiple ($X_2$) thereof (i.e., $P_{(loops)}=X_2 * P_{(rungs)}$). The locations of the cross-rungs 29 and the locations of intermediate guiding loops 21, between the top and bottom of the rear vertical members 17, 19, preferably do not coincide horizontally, and preferably, the integral values of $X_1$ and $X_2$ are identical.

The number of guiding loops 21 on each of the rear vertical members 17, 19 is preferably the same, and each guiding loop on each of the rear vertical members 17, 19 is preferably aligned horizontally with a guiding loop on the other rear vertical member(s). The number of beads 23 on each of the auxiliary tilt cords 14, 15 is preferably the same, and each bead on each of the auxiliary tilt cords is preferably aligned horizontally with a bead on the other auxiliary tilt cord(s). The number of engaging collars 25 on each of the auxiliary tilt cords 14, 15 is also preferably the same, and each collar 25 on each of the auxiliary tilt cords 14, 15 is preferably aligned horizontally with a collar on the other auxiliary tilt cord(s). The number of beads 23 spaced along each of the auxiliary tilt cords 14, 15 is equal to, or greater than, preferably equal to, the number of engaging collars 25 spaced along the auxiliary tilt cord.

The rearwardly-extending guiding loops 21 on the rear vertical members 17, 19 of the ladders 5, 7 keep the auxiliary tilt cords 14, 15 and the rear vertical members in close proximity to each other. In particular, the guiding loops 21 of each rear vertical member 17, 19 prevent the adjacent auxiliary tilt cord 14, 15, respectively, around which the guiding loops extend, from forming unsightly loops when the blind 1 is raised or from becoming entangled during use of the blind. When $P_{(loops)}$ equals $P_{(rungs)}$, the number of loops 21 equals the number of cross-rungs 29. This is illustrated in FIGS. 2, 3 where, between each adjacent pair of cross-rungs 29 of each ladder 5, 7, one guiding loop 21 is provided. The greater the number of loops 21, the better the auxiliary tilt cords 14, 15 are held to the rear vertical members 17, 19 during operation of the blind 1.

Preferably, each engaging collar 25, slidably located on an auxiliary tilt cord 14, 15, has a generally circular horizontal cross-section. Each collar also has a central vertically-extending passage 27, through which its auxiliary tilt cord can pass vertically but not the beads 23 on its auxiliary tilt cord. Each collar 25 further has a radially inwardly-extending vertical slit 28 which opens into its central passage 27. During assembly of the blind 1, one of the auxiliary tilt cords 14, 15 can be pushed through the slit 28 of each collar into its central passage 27. Each collar 25 also has a horizontal circumference greater than each guiding loop 21, so that the exterior size of the collar 25 is too large for the guiding loops 21 to pass vertically over the collar. However, the guiding loops 21 each have a diameter greater than the horizontal circumference of each bead 23, so that the beads can pass vertically through the guiding loops.

When the slats 13 of the blind 1 have been closed in a normal fashion (i.e., are downwardly-inclined from front to rear) and the rear vertical members 17, 19 are stationary, moving upwardly both the auxiliary tilt cords 14, 15, with their beads 23, causes the tilt cords to slide freely upwardly through the central passages 27 of their engaging collars 25 until their upwardly moving beads 23 engage their collars that are directly above their beads. Before the beads 23 on the auxiliary tilt cords 14, 15 reach their engaging collars 25, their beads can pass through one or more guiding loops 21 around the auxiliary tilt cords. Continued upward movement of the auxiliary tilt cords 14, 15 and their beads 23 then causes their collars 25 to move upwardly, with the tilt cords and beads, into engagement with the guiding loops 21 that are directly above their collars. This happens because the central passages 27 in the collars 25 are too small to allow the beads 23 on the auxiliary tilt cords 14, 15 to pass through them, and the exterior size of each collar 25 does not allow it to pass through the guiding loops 21.

If the blind 1 had only a single engaging collar 25 on each auxiliary tilt cord 14, 15, the blind would have two sections of slats 13, the lower one of which would be operated by the auxiliary tilt cords 14, 15. When the auxiliary tilt cords 14, 15 are raised (e.g., by pulling on the rear of the cord loop 8), their beads 23 beneath their engaging collars 25 would be moved upwardly until they engage and lift their collars 25, which would then slide upwardly along the tilt cords until they engage the adjacent next higher loops 21 on the adjacent rear vertical members 17, 19 of the ladders 5, 7. When the auxiliary tilt cords would continue thereafter to be lifted, the collars would then move upwardly, thereby lifting the next higher loops 21 and the portions of the rear vertical members 17, 19 below the next higher loops 21. This would move upwardly the rear of all the slats 13 below such next higher loops 21, so as to tilt all the slats below the next higher loops 21 from their normal closed position (i.e., downwardly-inclined from front to rear) toward their open position (i.e., horizontal). The slats 13 below the next higher loops 21 would then have a smaller tilt angle than the slats above the next higher loops 21. This would be due to the relative difference in pitch between the crossrungs ($P_{(rungs)}$) and that of the beads ($P_{(beads)}$). If the auxiliary tilt cords continue to be further lifted, all the slats 13 of the lower section of the blind, below such next higher loops 21, would continue to be so-tilted until they would be completely open.

In the blind 1 of FIGS. 1-5, there are two engaging collars 25 on each auxiliary tilt cord 14, 15, and the blind has three sections of slats 13, the lower and middle sections of slats 13A, 13B of which are operated by the auxiliary tilt cords 14, 15. The slats of the lower section 13A of the blind 1 of FIGS. 1-5 can be tilted relative to the slats of the middle and upper sections 13B, 13C by moving the auxiliary tilt cords 14, 15 upwardly together (e.g., by pulling on the rear of the cord loop 8), so that the lower bead 23A of each tilt cord moves upwardly and engages the tilt cord's lower engaging collar 25A (above the lower bead 23A), which then slides upwardly along the tilt cord until it engages the tilt cord's first adjacent, next higher loop 21A of its adjacent rear vertical member 17, 19 of the ladders 5, 7 and then lifts the rear of all the slats 13 of the lower section 13A below this first next higher loop 21A . When the blind 1 is closed, this movement of the auxiliary tilt cords 14, 15 upwardly causes all the slats of the lower section 13A (below the first next higher loops 21A) to be tilted from their normal closed position toward their open position. The slats below the first next higher loops 21A would then have a smaller tilt angle than the slats above the first next higher loops 21A.

If the tilt cords 14, 15 of the blind 1 are thereafter moved further upwardly, an upper bead 23B of each tilt cord moves further upwardly and engages the tilt cord's upper engaging collar 25B (above the upper bead 23B), which then slides upwardly along the tilt cord until it engages the tilt cord's second adjacent, next higher loop 21B of its adjacent rear vertical member 17, 19 of the ladders 5, 7 and then lifts the rear of all the slats 13 of the middle section 13B below the second next higher loop 21B. This causes all the slats of the middle section 13B (below the second next higher loops 21B) to be tilted from their normal closed position toward their open position and causes all the slats of the lower section 13A to be further tilted toward their open position. The slats 13 of the lower section 13A, below the first next higher loops 21A, would then have a smaller tilt angle than the slats between the first and second next higher loops 21A, 21B, and the slats of the middle section 13B, between the first and second next higher loops 21A, 21B, would then have a smaller tilt angle than the slats of the upper section 13C, above the second next higher loops 21B.

If the auxiliary tilt cords 14, 15 of the blind large then moved still further upwardly, all the slats 13 of the lower and middle sections 13A, 13B, below the second next higher loops 21B, would continue to be so-tilted until they would be completely open. However, the slats of the upper section 13C would remain in a normal closed position. If the auxiliary tilt cords 14, 15 are thereafter moved yet further upwardly, all the slats of the lower and middle sections 13A, 13B, below the second next higher loops 21B, would continue to be so-tilted until they would be in an abnormal closed position (i.e., downwardly-inclined from rear to front). Although the slats of the upper section 13C would still remain in a normal closed position, they could be opened simply by then moving the rear vertical members 17, 19 of the ladders 5, 7 downwardly together (e.g., by pulling on the front of the cord loop 8).

If desired, more than two engaging collars 25 and two beads 23 could be provided on each auxiliary tilt cord 14, 15. Thereby, the blind 1 would have more than three sections of slats 13 (between engaging collars 25) which could be progressively tilted to greater angles of openness, relative to one another, so as to provide a more gradual change in the tilting of the slats over the height of the blind.

As shown in FIG. 1, the blind 1 has a first or left (as viewed in FIG. 1), tilt swivel 9 and a second or right (as viewed in FIG. 1), tilt swivel 11 in the head rail 3 for moving its left and right ladders 5, 7 to tilt its horizontal slats 13. In this regard, the slats can be tilted by moving the interconnected, rear and front, vertical members 17, 18 and 19, 20 of the ladders 5, 7 in a conventional manner in opposite vertical directions, to alter the angular orientation of the ladders' crossrungs 29. Each of the slats 13 is supported on a confronting one of the crossrungs 29, between the rear and front, vertical members of each ladder, and thereby is pivoted by each tilt swivel 9, 11 to the same angular position as the pair of crossrungs 29 which support it.

FIG. 4 shows the left tilt swivel 9 which, in accordance with this invention, can both: i) move the rear and front, vertical members 17, 18 of the left ladder 5 in opposite vertical directions to pivot fully its cross-rungs 29 and the left side of the slats 13 thereon between the front and the rear of the blind 1; and move vertically the left auxiliary tilting cords 14. The left tilt swivel 9 has a conventional adjusting pulley 31 which rotates about the longitudinal axis of the head rail 3 in response to vertical movement of the cord loop 8. About the axis of rotation of the adjusting pulley 31 is a V-shaped annular groove 32 which, as shown, converges from the perimeter of the pulley towards it axis. The rear and front, vertical members 17, 18 of the left ladder 5 are connected by a conventional loop 33 of the material of the rear and front, vertical members which passes closely around the adjusting pulley 31 within its V-shaped annular groove 32. The annular groove 32 frictionally engages the loop 33, so that the rear and front, vertical members 17, 18 move vertically in opposite directions, with rotation of the adjusting pulley 31, between the normal closed and abnormal closed positions of the slats 13.

FIG. 4 also shows that the left tilt swivel 9 has a conventional winding drum 34 that is connected to, and coaxial with, the adjusting pulley 31. The winding drum 34 rotates about the longitudinal axis of the head rail 3 with rotation of the adjusting pulley 31, so that the left auxiliary tilt cord 14 is wound about the winding drum. The left auxiliary tilt cord 14 is fastened to the winding drum 34 with sufficient slack, so that: i) the adjusting pulley 31 can fully pivot all the cross-rungs 29 and the slats 13 thereon in the direction of closing the slats; and ii) further pivoting movement of the adjusting pulley 31 will start winding of the tilt cord 14 on the. winding drum 34, so as to raise the beads 23 on the tilt cord. Before one of the beads 23 of the left auxiliary tilt cord 14 reaches the adjacent engaging collar 25 on the tilt cord, the bead can pass through one or more guiding loops 21 around the tilt cord. Further such winding of the left auxiliary tilt cord 14 on the winding drum 34 further lifts the tilt cord 14 and its beads 23 which causes one of the beads to engage a collar 25 on the tilt cord and to lift the collar, so that it slides along the tilt cord until it engages the next higher guiding loop 21 around the tilt cord. Still further such winding of the left auxiliary tilt cord 14 on the winding drum 34 still further lifts the tilt cord 14, its beads 23 and its engaged collar 25, as well as the engaged guiding loop 21, thereby lifting the portion of the rear vertical member 17 of the left ladder 5 below its engaged guiding loop 21. This causes the cross-rungs 29 and the slats 13 thereon, below the engaged guiding loop, to pivot towards an open position. During such further winding of the left auxiliary tilt cord 14 on the winding drum 34, rotation of the adjusting pulley 31 with the winding drum does not further raise the rear vertical member 17 of the first ladder 5 because its loop 33 will simply slip about the adjusting pulley 31 within its V-shaped groove 32.

The right tilt swivel 11 in the head rail 3, for tilting the horizontal slats 13 by moving the vertical members 19, 20 of the right ladder 7 in opposite vertical directions, is mechanically identical to the left tilt swivel 9, and the right tilt swivel 11 operates in the same way as, and together with, the left tilt swivel 9 upon movement of the cord loop 8.

FIG. 5 shows a conventional worm gearing 35, connected to the cord loop 8, for driving a conventional horizontally-elongated tilt rod 37. The tilt rod 37 extends along the longitudinal axis of the head rail 3 and through the tilt swivels 9, 11. The tilt rod 37 rotates upon movement of the cord loop 8, which makes the worm gearing 35 rotate. Such rotation of the tilt rod 37 causes the adjusting pulley 31 and winding drum 34 also to rotate, thereby raising the rear vertical members 17, 19 of the ladder 5, 7, as well as the auxiliary tilt cords 14, 15, so as to open and close the slats 13. Internal friction in the worm gearing 35 prevents the tilt rod 37 and thereby the adjusting pulley 31 and winding drum 34 from rotating when the cord loop 8 is not being moved so as to rotate the worm gearing.

FIG. 6 shows a second embodiment of a blind 101 of the invention which is similar to the blind 1 of FIGS. 1-5 and for which corresponding reference numerals (greater by 100) are used below for describing the same parts or corresponding parts.

As shown in FIG. 6, the blind 101 includes: a horizontally-extending head rail 103; a horizontally-extending bottom rail 104; a pair of vertically-extending ladders 105, 107 (not visible in FIG. 6), each having a rear vertical member 117, 119 (not visible in FIG. 6) and a front vertical member 118, 120 (not visible in FIG. 6) and a plurality of cross-rungs 129 between its rear and front, vertical members; and a plurality of slats 113 suspended from the head rail on the cross-rungs. A conventional rod-operated tilter 108, attached to compatible gearing (not shown) in the head rail 103, replaces the cord loop 8 and worm gearing 35 of the blind 1 of FIGS. 1-5. In this regard, a suitable filter and compatible gearing are described in, for example, WO 98/27307, U.S. Pat. Nos. 4,541,468, 3,921,695, 3,918,513 and 3,425,479.

The blind 101 of FIG. 6 features additional laterally-extending cross-rungs 130 between each of the rear vertical members 117, 119 of the ladders 105, 107 and one of a pair of auxiliary tilt cords 114, 115 (not visible in FIG. 6) which is to the rear of the rear vertical member. The auxiliary tilt cords 114, 115 are each connected to a separate tilt swivel (not shown) in the head rail which is connected to, and pivots with. a longitudinally-extending tilt rod (not shown) in the head rail that is connected to the gearing of the filter 108. The first pitch P1 between each of the cross-rungs 129 (which connect the rear and front vertical members 117, 118 and 119, 120 of the ladders 105, 107) is slightly greater than the second pitch P2 between each of the additional cross-rungs 130 (which connect the auxiliary tilt cords 114, 115 and the rear vertical member 117, 119). The auxiliary tilt cords 114, 115 replace the auxiliary tilt cords 14, 15 of the blind 1 of FIGS. 1-5 and enable the individual slats 113 of the blind 101 to be tilted progressively (rather than by sections of slats as in the blind 1 of FIGS. 1-5) from the lowermost slat to the uppermost slat, from their normal closed position to an open position, when the auxiliary tilt cords 114, 115 are moved upwardly by twisting the tilter 108.

The vertical distance, over which the slats 113 are progressively tilted to an open position is determined by the difference between the first pitch P1 of the cross-rungs 129 and the second pitch P2 of the additional cross-rungs 130. For example, conventional ladders 105, 107 for the venetian blind 101, with 25 mm wide slats 113, could normally have a first pitch P1 of 20 mm. If such ladders 105, 107 are modified by the additional cross-rungs 130 connected to the auxiliary tilt cords 114, 115 at a second pitch P2 of 19 mm, the vertical distance, in terms of the number of slats, between the first fully closed slat 113A (i.e., the lowest closed slat) and the first fully open slat (i.e., the lowest open slat) will be: the first pitch P1 (i.e., 20 mm), divided by the difference between the first and second pitches (i.e., P1−P2=20 −19=1 mm), which means that the vertical distance will be twenty slats. A vertical distance of twenty slats of 25 mm lateral width (normally with 5 mm lateral overlap when fully closed) normally corresponds to 400 mm of vertical height of the blind 101.

When the auxiliary tilt cords 114, 115 of such a blind 101 (with 25 mm-wide slats) are raised with all the slats 113 tilted in a normal closed position (i.e., downwardly-inclined from front to rear), then initially the lowest slat 113A will be tilted towards its fully open (i.e., horizontal) position while the nineteen slats (not shown in FIG. 6) just above the lowest slat will have a gradually less open position of tilt as the height of each slat above the lowest slat becomes greater, and the uppermost slat of the twenty lowest slats of the blind will still be tilted closed, as will the remaining slats (not shown in FIG. 6) of the blind above the lowest twenty slats. One side effect of this arrangement will be that the lowest slat 113A, after being fully opened, will be subsequently lifted, together with the bottom rail 104, by raising further the auxiliary tilt cords 114, 115 to open further the slats above the lowermost slat. This side effect of raising the lowermost slat and the bottom rail can be avoided by providing the blind 101 with extra slats 113 and more height, so that all the slats can be opened by moving upwardly the auxiliary tilt cords 114, 115—without there being an objectionable light gap underneath the bottom rail 104. The number of additional slats 113, required for this purpose, is a function of the ratio between the total height H of the blind 101 and the distance over which its slats 113 are to gradually change their tilt position from normal closed to open. In the blind 101 with 25 mm wide slats 113, a first pitch (P1) of 20 mm (and 5 mm overlap when fully closed), a vertical distance between the lowest fully closed slat and the lowest fully open slat 113A of 400 mm and a difference between the first and second pitches (P1–P2) of 1 mm, a total height of the blind of 2000 mm requires 2000/400=5 additional slats to prevent the occurrence of a light gap.

The auxiliary tilt cords 114, 115 should be of sufficient lateral length and have sufficient slack so as not to interfere with the basic slat-tilting function of the rear and front, vertical members 117, 118 and 119, 120 of the ladders 105, 107 and their cross-rungs 129. This requires, inter alia, that there be a minimum lateral length L for the additional cross-rungs 130, relative to the height H of the blind 101. The minimum length L for the additional cross-rungs 130 for a given height H of blind is such that when all of the slats 113 of the blind 101 are in an open (i.e., horizontal) position as shown in FIG. 6, the additional cross-rungs 130A, connected to the rear vertical members 117, 119 at the lowest slat 113A, extend upwardly from the rear vertical members and the additional cross-rung 130C, connected to the rear vertical members at the uppermost slat 113C, extend downwardly from the rear vertical members.

Furthermore, the lateral length L of each additional cross-rung 130 of the blind 101 should be at least one-half of the total difference in the first and second pitches (i.e., P1–P2) for the maximum height of the blind 101. The minimum length L of each additional cross-rung 130 is thus one-half of the product of the total number of slats 113, corresponding to the maximum height of the blind, times the difference in the first and second pitches. For example, if the height of the blind 101 is to be a maximum of 2000 mm, then with a first pitch (P1) of 20 mm, the total number of slats 113 would be one hundred, and with a difference in the first and second pitches (i.e., P1–P2) of 1 mm, the minimum length L of each additional cross-rung would be one-half of 100 mm or 50 mm. Any ladder 105, 107 of the blind 101 of FIG. 6, which is long enough for the maximum height of the blind, would be equally suitable for any smaller height of the blind.

FIG. 7 shows a third embodiment of a blind 201 of the invention which is similar to the blind 101 of FIG. 6 and for which corresponding reference numerals (greater by 100) are used below for describing the same parts or corresponding parts.

As shown in FIG. 7, the blind 201 includes: a horizontally-extending head rail 203; a horizontally-extending bottom rail 204; a pair of vertically-extending ladders 205, 207 (not visible in FIG. 7), each having a rear vertical member 217, 219 (not visible in FIG. 7) and a front vertical member 218, 220 (not visible in FIG. 7) and a plurality of cross-rungs 229 between its rear and front, vertical members; a plurality of slats 213 suspended from the head rail on the cross-rungs; and rod-operated tilter 208, attached to compatible gearing (not shown) in the head rail 203.

The blind 201 of FIG. 7 features a plurality of vertically-aligned tubular elements 230 about each of the rear vertical members 217, 219 of the ladders 205, 207. Each tubular element 230 is between a different pair of vertically adjacent cross-rungs 229 of one of the ladders 205, 207 and surrounds a section of the rear vertical member 217, 219 of the ladder between its successive cross-rungs. Each tubular element 230 is of a length L that is slightly smaller than the first pitch P1 of the ladders 205, 207. Each plurality of vertically-aligned tubular elements 230 about one of the rear vertical members 217, 219 of the ladders 205, 207 also surrounds one of the auxiliary tilt cords 214, 215 (not visible in FIG. 7) to the rear of the one rear vertical member. Each auxiliary tilt cord 214, 215 has an engaging knot 240 at its lowermost end which extends downwardly of the lowermost tubular element 230A. Each auxiliary tilt cord 214, 215 is of sufficient length and has sufficient slack, so as not to interfere with the normal operation of the blind 201.

The vertical distance, over which the slats 213 are progressively tilted to an open position is determined by the difference between the pitch P1 of the cross-rungs 229 and the length L of the tubular elements 230. For example, conventional ladders 205, 207 for the venetian blind 201, with 25 mm wide slats 213, could normally have a pitch P1 of 20 mm. If such ladders 205, 207 are modified by the tubular elements 230 on the rear vertical members 217, 219 and the auxiliary tilt cords 214, 215 with a length L of 19 mm, the vertical distance, in terms of the number of slats, between the first fully closed slat 213A (i.e., the lowest closed slat) and the first fully open slat (i.e., the lowest open slat) will be: the first pitch P1 (i.e., 20 mm), divided by the difference between the pitch P1 and the length L (i.e., 20−19=1 mm), which means that the vertical distance will be twenty slats. A vertical distance of twenty slats of 25 mm lateral width (normally with 5 mm lateral overlap when fully closed) normally corresponds to 400 mm of vertical height of the blind 201.

When the auxiliary tilt cords 214, 215 of such a blind 201 (with 25 mm-wide slats) are raised with all the slats 213 tilted in a normal closed position (i.e., downwardly-inclined from front to rear), then initially the lowest slat 213A will be tilted towards its fully open (i.e., horizontal) position while the nineteen slats (not shown in FIG. 7) just above the lowest slat will have a gradually less open position of tilt as the height of each slat above the lowest slat becomes greater, and the uppermost slat of the twenty lowest slats of the blind will still be tilted closed, as will the remaining slats (not shown in FIG. 7) of the blind above the lowest twenty slats.

This invention is, of course, not limited to the above-described embodiments which may be modified without departing from the scope of the invention or sacrificing all of its advantages. In this regard, the terms in the foregoing description and the following claims, such as "longitudinal", "lateral", "length", "horizontal", "vertical", "above", "below", "upwardly", "downwardly", "top", "bottom", "front", "rear", "right" and "left", have been used only as relative terms to describe the relationships of the various elements of the venetian blind of the invention.

For example, each engaging collar 25 of the blind 1 could be replaced by a clip which has one or more, vertically-extending passages, through which one of the blind's rear vertical members 17, 19 and its associated auxiliary tilt cord 14, 15 or just one of the auxiliary tilt cords pass. The collar 25 could also comprise two generally C-shaped halves which could be connected to each other about its associated auxiliary tilt cord 14, 15.

Figure 8:
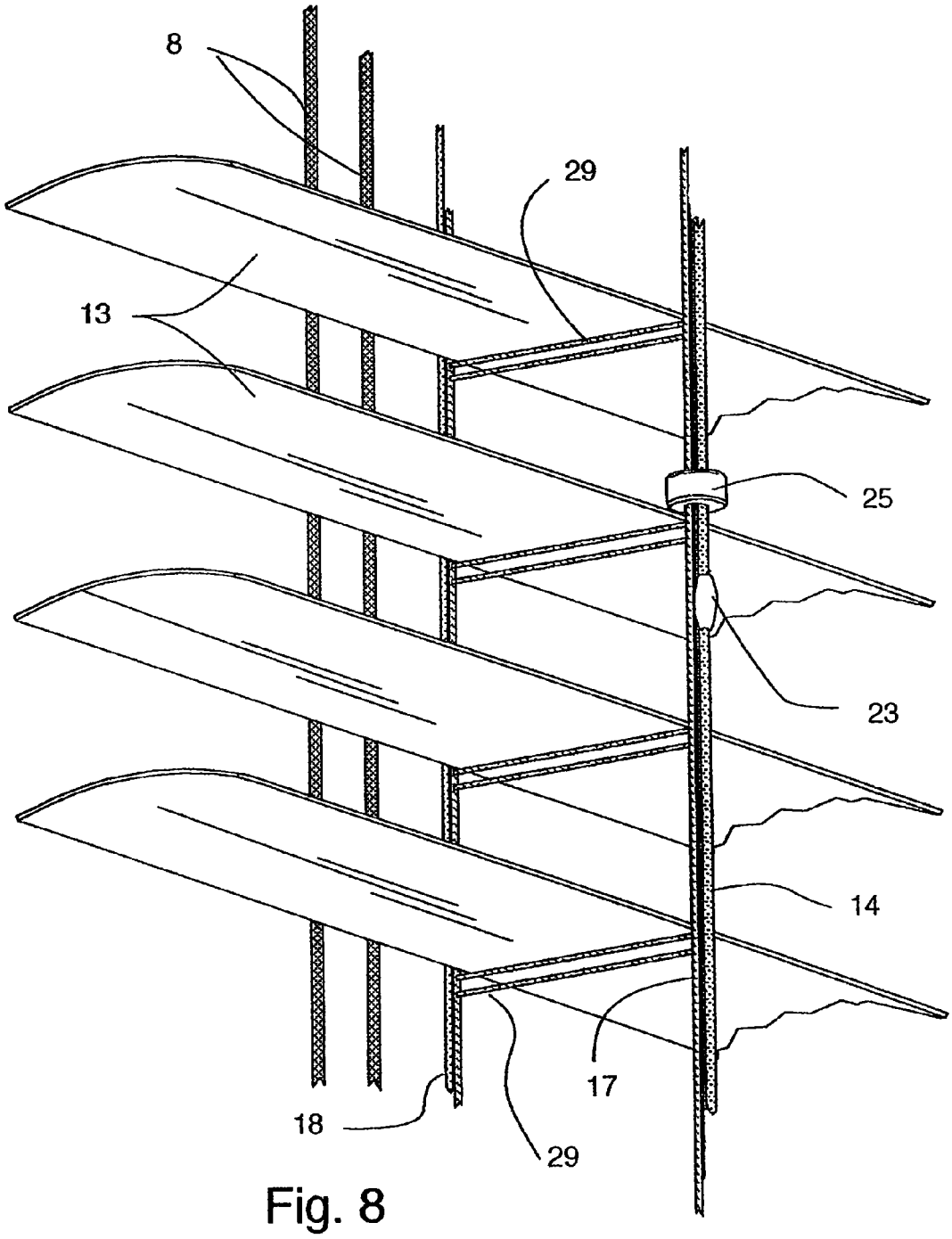
*FIG. 8 is a perspective of a fourth embodiment.*

Similarly, *as shown in FIG. 8,* the function of the guiding loops 21 of the blind 1 could be incorporated into the engaging collars 25. In this regard, a plurality of collars 25 could be slidably mounted about each auxiliary tilt cord 14, 15 and about its associated rear vertical member 17, 19, between each adjacent pair of cross-rungs 29 or between selected pairs of cross-rungs of the rear vertical member 17, 19.

Guiding loops 21 are preferably used in the blinds of this invention. However, when no guiding loops are used, both a rear vertical member 17, 117, 217, 19, 119, 219 and its associated auxiliary tilt cord 14, 114, 214, 15, 115, 215 could be within the central passage 27 of each collar 25.

There are preferably only two or three, particularly only two, of the beads 23 and of the engaging collars 25 on each auxiliary tilt cord 14, 15 of the blind 1, but there could, if desired, be five to ten of each on each auxiliary tilt cord. Likewise, there are preferably ten or more guiding loops 21 on each rear vertical member 17, 19, depending on the length of the vertical member, but there could, if desired, be only five to ten guiding loops.

Preferably, each tilt swivel 9, 11 of the blinds 1, 101, 201 of this invention can both move the rear and front, vertical members 17, 117, 217, 18, 118, 218 and 19, 119, 219, 20, 120, 220 of one of the ladders 5, 105, 205, 7, 107, 207 in opposite vertical directions and move vertically the associated auxiliary tilt cord 14,114, 214, 15, 115, 215 in response to movement of the cord loop 8 or tilter 108, 208. However, if desired, rotation of the winding drum 34 of each tilt swivel 9, 11 could be controlled by different means (e.g., a separate pull cord connected to the top of both auxiliary tilt cords) from the cord loop or tilter which controls rotation of the adjusting pulley 31. Such separate means would allow lower portions of the blind, when fully open, to be selectively closed by simply actuating such separate means to pull both auxiliary tilt cords upwardly.

Moreover, the normal closed position of the slats 13, 113, 213 of the blinds 1, 101, 201 could alternatively be downwardly-inclined from rear to front, and the abnormal closed position of the blind could be downwardly-inclined from front to rear.

Furthermore, a blind of this invention could have the ladders 5, 7 of the blind 1 with their regularly spaced guiding loops 21 and also have the auxiliary tilt cords 14, 15 of the blind 1, extending through the guiding loops but have the tubular elements 230 of the blind 201 only on each auxiliary tilt cord between pairs of vertically adjacent loops. In such a blind, the length L of the tubular elements would be smaller than the second pitch P2 of the loops and have a predefined relation to the first pitch P1 of the cross-rungs of the ladders.

Yet further, a blind of this invention could have a single common winding drum for the auxiliary tilt cords 14, 114, 214, 15, 115, 215, which would not be operatively connected with the tilt swivels 9, 11 of the ladders 5, 105, 205, 7, 107, 207 but would be operate by a separate manually operable cord loop.

In addition, a conventional, downwardly-extending, spacer bracket (not shown) could be mounted on the rear of the head rail 3, 103, 203 of a blind of this invention, adjacent the point of entry of each auxiliary tilt cord 14, 114, 214, 15, 115, 215 into the bottom of the head rail. The bracket could thereby serve to route the auxiliary tilt cord rearwardly of the bracket before the tilt cord enters the head rail, to keep it from rubbing against the adjacent rear vertical member 17, 117, 217, 19, 119, 219 where they both enter the head rail.

We claim:

1. A venetian blind including:

at least two vertically-extending slat-supporting ladders, each ladder comprising first and second vertical members connected by a plurality of vertically-spaced cross-rungs;

a plurality of horizontally-arranged slats, each slat being supported on one of said cross rungs in each of said ladders and between said first and second vertical members;

an adjusting mechanism for commonly pivoting each of said slats about its longitudinal axis by moving said first and second vertical members of said ladders in vertically opposite directions;

a vertically-extending auxiliary tilt cord that is adjacent to a first vertical member of a ladder and can be moved vertically in a direction;

engaging means, on said auxiliary tilt cord and said adjacent first vertical member of said ladder, for moving said adjacent first vertical member at an intermediate location along its length vertically in said direction with vertical movement of said auxiliary tilt cord in said direction, so as to adjust the angular pivot of a section of the cross-rungs connected to said first vertical member above or below said intermediate location; said engaging means including: a guiding loop on said first vertical member; a bead fixed on said auxiliary tilt cord and vertically spaced away from said guiding loop; and an engaging collar slidably positioned on said auxiliary tilt cord between said guiding loop and said bead; said auxiliary tilt cord extending through said guiding loop; said bead being adapted to engage said engaging collar and thereafter move said engaging collar toward said guiding loop when said auxiliary tilt cord is moved vertically in said direction; and said engaging collar being adapted to engage said guiding loop when said auxiliary tilt cord is moved further vertically in said direction.

2. The venetian blind of claim 1 wherein said bead and said engaging collar are below said guiding loop and said auxiliary tilt cord can be moved upwardly to adjust the angular pivot of a section of the cross-rungs connected to said first vertical member below said intermediate location.

3. The venetian blind of claim 1 which comprises at least two, vertically extending auxiliary tilt cords, each of which is adjacent to a first vertical member of one of said ladders; and wherein said engaging means is on each of said auxiliary tilt cords and each of said adjacent first vertical members.

4. A venetian blind including:

at least two vertically-extending slat-supporting ladders, each ladder comprising first and second vertical members connected by a plurality of vertically-spaced cross-rungs;

a plurality of horizontally-arranged slats, each slat being supported on one of said cross rungs in each of said ladders and between said first and second vertical members;

an adjusting mechanism for commonly pivoting each of said cross rungs and each of said slats about its longitudinal axis by moving said first and second vertical members of said ladders in vertically opposite directions;

a vertically-extending auxiliary tilt that is adjacent to a first vertical member of a ladder and can be moved vertically in a direction;

engaging means, on said auxiliary tilt cord and said adjacent first vertical member of said ladder, for moving said adjacent first vertical member at an intermediate location along its length vertically in said direction with vertical movement of said auxiliary tilt cord in said direction, so as to adjust the angular pivot of a section of the cross-rungs connected to said first vertical member above or below said intermediate location; and manipulating means for moving said auxiliary tilt cord vertically in said direction which comprises a winding drum, attached to said auxiliary tilt cord, for winding said auxiliary tilt cord only after said adjusting mechanism has moved said first and second vertical members of said ladders in vertically opposite directions.

5. The venetian blind of claim 4 wherein said engaging means can move said auxiliary tilt cord upwardly to adjust the angular pivot of a section of the cross-rungs connected to said first vertical member below said intermediate location.

6. The venetian blind of claim 4 which comprises at least two, vertically-extending auxiliary tilt cords, each of which is adjacent to a first vertical member of one of said ladders; and wherein said engaging means is on each of said auxiliary tilt cords and each of said adjacent first vertical members.

7. The venetian blind of claim 6 wherein said manipulating means comprises at least two winding drums, each connected to said adjusting mechanism and each being adapted to wind one of said auxiliary tilt cords only after said adjusting mechanism has moved said first and second vertical members of said ladders in vertically opposite directions.

8. The venetian blind of claim 7 wherein each of said winding drums wind one of said auxiliary tilt cords only after said adjusting mechanism has moved said first and second vertical members of said ladders in vertically opposite directions to pivot fully all said cross-rungs in one of two opposite directions.

9. The venetian blind of claim 4 wherein said adjusting mechanism comprises a pulley for winding said first or second vertical member of each of said ladders.

10. The venetian blind of claim 7 wherein said adjusting mechanism comprises at least two pulleys for winding said first or second vertical member of each of said ladders; each pulley being connected to one of said winding drums.

11. The venetian blind of claim 8 wherein said adjusting mechanism comprises at least two pulleys for winding said first or second vertical member of each of said ladders; each pulley being connected to one of said winding drums.

12. The venetian blind of claim 4 wherein said engaging means includes: a guiding loop on said first vertical member; a bead fixed on said auxiliary tilt cord and vertically spaced away from said guiding loop; and an engaging collar slidably positioned on said auxiliary tilt cord between said guiding loop and said bead; said auxiliary tilt cord extending through said guiding loop; said bead being adapted to engage said engaging collar and thereafter move said engaging collar toward said guiding loop when said auxiliary tilt cord is moved vertically in said direction; and said engaging collar being adapted to engage said guiding loop when said auxiliary tilt cord is moved further vertically in said direction.

13. The venetian blind of claim 12 wherein said bead and said engaging collar are below said guiding loop and said auxiliary tilt cord can be moved upwardly to adjust the angular pivot of a section of the cross-rungs connected to said first vertical member below said intermediate location.

14. The venetian blind of claim 1 wherein said bead is adapted to be moved vertically through said guiding loop unobstructed, with vertical movement of said auxiliary tilt cord, if said bead has not engaged said engaging collar and is thereby prevented from moving vertically through said guiding loop.

15. The venetian blind of claim 14 comprising a plurality of said guiding loops that are regularly spaced along said adjacent first vertical member and have a vertical spacing, between them, which is an integer value of a vertical spacing between said cross-rungs.

16. The venetian blind of claim 15 comprising a plurality of said beads that are regularly spaced along said auxiliary tilt cord and have a vertical spacing, between them, which is an integer value of a dimension that is slightly less than the vertical spacing between said guiding loops.

17. The venetian blind of claim 16 comprising a plurality of said engaging collars that are regularly spaced along said auxiliary tilt cord between selected adjacent pairs of said plurality of guiding loops, whereby there is at most one engaging collar for every five cross-rungs along said adjacent first vertical member.

18. The venetian blind of claim 17 wherein said engaging collars are slidably positioned about said auxiliary tilt cord and said adjacent first vertical member.

19. The venetian blind of claim 12 wherein said bead is adapted to be moved vertically through said guiding loop unobstructed, with vertical movement of said auxiliary tilt cord, if said bead has not engaged said engaging collar and is thereby prevented from moving vertically through said guiding loop.

20. The venetian blind of claim 19 comprising a plurality of said guiding loops that are regularly spaced along said adjacent first vertical member and have a vertical spacing, between them, which is an integer value of a vertical spacing between said cross-rungs.

21. The venetian blind of claim 20 comprising a plurality of said beads that are regularly spaced along said auxiliary tilt cord and have a vertical spacing, between them, which is an integer value of a dimension that is slightly less than the vertical spacing between said guiding loops.

22. The venetian blind of claim 21 comprising a plurality of said engaging collars that are regularly spaced along said auxiliary tilt cord between selected adjacent pairs of said plurality of guiding loops, whereby there is at most one engaging collar for every five cross-rungs along said adjacent first vertical member.

23. The venetian blind of claim 22 wherein said engaging collars are slidably positioned about said auxiliary tilt cord and said adjacent first vertical member.

*24. A venetian blind including:*

*at least two vertically-extending slat-supporting ladders, each ladder comprising first and second vertical members connected by a plurality of vertically-spaced cross-rungs;*

*a plurality of horizontally-arranged slats, each slat being supported on one of said cross-rungs in each of said ladders and between said first and second vertical member;*

*an adjusting mechanism for commonly pivoting each of said slats about its longitudinal axis by moving said first and second vertical members of said ladders in vertically opposite directions;*

*a vertically-extending auxiliary tilt cord that is adjacent to a first vertical member of a ladder and can be moved vertically in a direction; and*

*engaging means for moving said adjacent first vertical member at an intermediate location along its length vertically in said direction with vertical movement of said auxiliary tilt cord in said direction, so as to adjust the angular pivot of a section of the cross-rungs connected to said first vertical member above or below said intermediate location; said engaging means including:*

*an engaging collar slidably positioned about said auxiliary tilt cord and said adjacent first vertical member adjacent a cross-rung; and*

*a bead fixed on said auxiliary tilt cord and vertically spaced away from said engaging collar; said bead being adapted to engage said engaging collar and thereafter move said engaging collar toward one of the adjacent cross-rungs when said auxiliary tilt cord is moved vertically in said direction;*

*and said engaging collar being adapted to engage said cross-rung when said auxiliary tilt cord is moved further vertically in said direction.*

*25. The venetian blind of claim 24 wherein said engaging collar is between a pair of said vertically spaced cross-rungs, and said auxiliary tilt cord can be moved upwardly to adjust the angular pivot of a section of the cross-rungs connected to the first vertical member below said intermediate position.*

*26. The venetian blind of claim 24 which comprises at least two, vertically extending auxiliary tilt cords, each of which is adjacent to a first vertical member of one of said ladders.*

*27. The venetian blind of claim 24 comprising a plurality of engaging collars that are slidably mounted about said auxiliary tilt cord and said first vertical member between each adjacent pair of cross-rungs of said first vertical member.*

*28. The venetian blind of claim 27 comprising a plurality of beads that are spaced along said auxiliary tilt cord, each of the plurality of beads associated with one of the plurality of engaging collars.*

*29. The venetian blind of claim 24 comprising a plurality of engaging collars that are slidably mounted about said auxiliary tilt cord and said first vertical member between selected pairs of cross-rungs of said first vertical member.*

*30. The venetian blind of claim 29 comprising a plurality of beads that are spaced along said auxiliary tilt cord, each of the plurality of beads associated with one of the plurality of engaging collars.*

* * * * *